(12) United States Patent
Kirchhoff

(10) Patent No.: US 7,941,841 B2
(45) Date of Patent: May 10, 2011

(54) FIREWALL-TOLERANT VOICE-OVER-INTERNET-PROTOCOL (VOIP) EMULATING SSL OR HTTP SESSIONS EMBEDDING VOICE DATA IN COOKIES

(76) Inventor: Debra C. Kirchhoff, Santa Barbara, CA (US)

( * ) Notice: Subject to any disclaimer, the term of this patent is extended or adjusted under 35 U.S.C. 154(b) by 1076 days.

(21) Appl. No.: 11/713,196

(22) Filed: Mar. 1, 2007

(65) Prior Publication Data

US 2007/0250702 A1 Oct. 25, 2007

Related U.S. Application Data

(62) Division of application No. 10/248,762, filed on Feb. 14, 2003, now Pat. No. 7,206,932.

(51) Int. Cl.
*H04L 9/00* (2006.01)
*G06F 9/00* (2006.01)
*G06F 15/16* (2006.01)
*G06F 17/00* (2006.01)

(52) U.S. Cl. .......................................... 726/14; 713/151
(58) Field of Classification Search .................. 726/14; 713/151
See application file for complete search history.

(56) References Cited

U.S. PATENT DOCUMENTS 7,093,129 B1 * 8/2006 Gavagni et al. ............... 713/175
2002/0124090 A1 * 9/2002 Poier et al. .................... 709/228

* cited by examiner

*Primary Examiner* — Kambiz Zand
*Assistant Examiner* — Aubrey H Wyszynski
(74) *Attorney, Agent, or Firm* — Birch, Stewart, Kolasch & Birch, LLP

(57) ABSTRACT

A voice-over-Internet-Protocol (VoIP) client codes audio data as printable ASCII characters, then embeds the ASCII audio data inside a cookie that is sent over the Internet within an HTTP GET message. The GET message is sent to a server acting as a call proxy or external manager that forwards the audio data to a remote client. Return audio data is sent back to the client in the normal data field of an HTTP response message from the server. When the client receives the HTTP response, it sends another GET message without audio data, allowing the server to send another response. This empty GET allows VoIP to pass through strict firewalls that pair each HTTP response with a GET. For secure-sockets layer (SSL), client and server exchange pseudo-keys in hello and finished messages that establish the SSL session. Audio data is streamed in SSL messages instead of encrypted data.

3 Claims, 10 Drawing Sheets

| APPLICATION 7 | LAYER 7 | MESSAGES (SOCKETS, API) |
| PRESENTATION 6 | LAYER 6 | DATA FORMAT (CONV,ENCRYPT) |
| SESSION 5 | LAYER 5 | APP DIALOG (RPC) |
| TRANSPORT 4 | LAYER 4 | SEGMENTATION (TCP,UDP,ICMP) |
| NETWORK 3 | LAYER 3 | ROUTING (DATAGRAMS,IP) |
| DATA LINK 2 | LAYER 2 | ENCAPSULATION (FRAMES,MAC) |
| PHYSICAL 1 | LAYER 1 | ELECTRICAL INTERFACE (BITS) |

```
HTTP/1.1 GET <made up name to get>                    80
 Accept: */*
 Accept-Language: en-us
 Accept-Encoding: gzip, deflate
 User-Agent: <user agent info>
 Host: <IP address of server>

Cookie: x=<binary VOICE A-->B data encoded in ascii>  82
```

GET WITH VOICE COOKIE

FIG. 6A

```
HTTP/1.1 200 OK                                  84
  Server: <Server identification>
  Date: Thu, 03 Jan 2002 16:00:00 GMT
  Cache-Control: private
  Expires: Thu, 03 Jan 2002 16:00:00 GMT
  Content-Type: application/octet-stream
  Content-Length: <length of data>
  ------------------------------------------
  <binary VOICE B-->A data>     86
```

REPLY WITH VOICE DATA

FIREWALL-TOLERANT VOICE-OVER-INTERNET-PROTOCOL (VOIP) EMULATING SSL OR HTTP SESSIONS EMBEDDING VOICE DATA IN COOKIES

CONTINUING DATA

This application is a division of application Ser. No. 10/248,762, filed Feb. 14, 2003, now U.S. Pat. No. 7,206,932.

BACKGROUND OF INVENTION

This invention relates to voice over Internet-Protocol (VoIP) software, and more particularly to VoIP through firewalls.

Internet-enabled communication such as electronic mail, web browsing, instant messaging, and video and audio streaming are common today. The Internet can also be used to make telephone calls using voice-over-Internet-Protocol (VoIP) technology. Video messages may also be exchanged using enhancements to VoIP technology.

Unfortunately, other programs can interfere with VoIP. To protect local computers and networks from unauthorized use or even outright attack, a barrier between a local network and the Internet is often employed. This barrier is known as a firewall, since it protects internal networks from the ravages of the open Internet.

Firewall is a generic term that describes an array of different technologies for securing computer networks. Some common Firewall technologies are Packet Filters, Proxy Servers, Network Address Translation, Port Address Translation and Application Protocol Filtering. Firewalls can be implemented in routers, special firewall appliances, and bastion hosts at the connection point of two or more computer networks. Personal firewalls are a software application running on a personal computer.

Firewalls can operate on different levels of the network. FIG. 1 is a reference diagram for the Open Systems Interconnection (OSI) network model. Packets passing through a firewall can be filtered by examining their IP addresses, TCP ports, protocols, states, or other header criteria at network layer 3 or transport layer 4.

Dynamic or stateful packet filters can operate on most of the layers. Only specifically-configured traffic is allowed through the firewall, such as web-browser traffic that uses Transport-Control-Protocol (TCP) on port 80. All traffic from outside the firewall can be blocked except when a connection is opened from within the firewall. A temporary return path, opening, or window is created through the firewall for each connection initiated from the local network within the firewall. This window closes when the connection is closed.

Proxy servers can operate on layers 3, 4, or application layer 7. Clients behind the firewall connect to the proxy server, which then makes another connection to the final server. Application protocol filtering can also operate on layer 7. Presentation layer 6, and session layer 5 are between the sockets of layer 7 and the TCP connections of layer 4. Data link layer 2 encapsulates the data into the actual packets or frames transmitted over the physical layer 1.

Firewalls can interfere with some Internet applications, even preventing their use across firewalls. For example, VoIP applications can be blocked by firewalls. Some firewalls only allow a few applications to pass packets through, such as web-browser traffic using port 80 and the hyper-text transfer protocol (HTTP) or port 443 with the secure-sockets layer (SSL). Packets to ports other than 80 and 443 may be blocked by firewalls.

FIG. 2 illustrates how a firewall can block TCP packets for a VoIP application. Personal computer PC 10 is protected by firewall 14, while server or PC 12 is directly connected to Internet 16.

Voice call applications may use standard web-browser settings. For example, audio from the user at PC 10 can be sent over Internet 16 to port 80 of PC 12 using the HTTP protocol. Outgoing TCP/IP packets containing higher-level browser-like commands, such as the HTTP GET command, can pass through firewall 14 since they originate from within (inside) firewall 14.

The reverse-direction audio stream is sent from PC 12 to PC 10. For example, PC 12 may act as a web server and send TCP/IP packets back to PC 10 using an HTTP response message. Many firewalls may allow such TCP/IP packets to pass through, but other more restrictive firewalls may match each HTTP response to an HTTP GET from inside the firewall. Other firewalls may terminate an HTTP session after a timeout period.

For example, after the first HTTP response is received by PC 10, a restrictive firewall 14 may close the HTTP session if a second HTTP response is sent without a second GET. Without another GET, firewall 14 may prevent other HTTP response messages from passing through after the first HTTP response. Thus while first HTTP response_1 is passed through firewall 14, second HTTP response_2 is blocked by firewall 14.

Audio streams are often long and need to send audio data at different times in different messages. When PC 12 attempts to stream audio back to PC 10 using several HTTP messages, firewall 14 terminates the HTTP session and blocks the session's packets in both directions. Firewall 14 then sees any subsequent HTTP response packets as coming from Internet 16 without a matching HTTP GET request from PC 10 within the firewall. Firewall 14 blocks these packets, assuming that they are unauthorized and possibly an attack on the local network.

What is desired is a method for passing packets and audio data through a firewall and to allow entry of audio or video streams originating from outside the firewall. A program that can use a firewall window for standard web-browser traffic is desired. Using openings in firewalls for standard web traffic such as HTTP or SSL sessions is especially desired to allow VoIP to operate across restrictive firewalls.

BRIEF DESCRIPTION OF DRAWINGS

FIG. 6A shows an HTTP GET message with a VoIP cookie that contains audio data.

FIG. 6B shows an HTTP response message that contains audio data.

DETAILED DESCRIPTION

The present invention relates to an improvement in Voice-over-Internet Protocol (VoIP) through restrictive firewalls. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
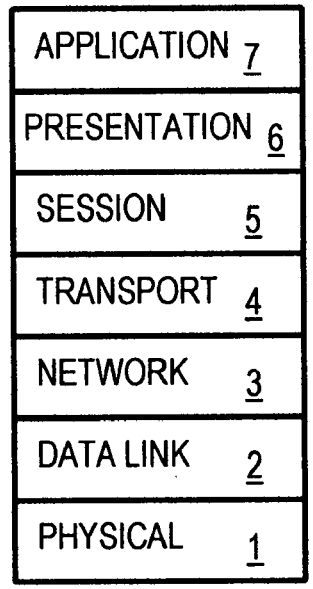
FIG. 1 is a reference diagram for the Open Systems Interconnection (OSI) network model.
Figure 2:
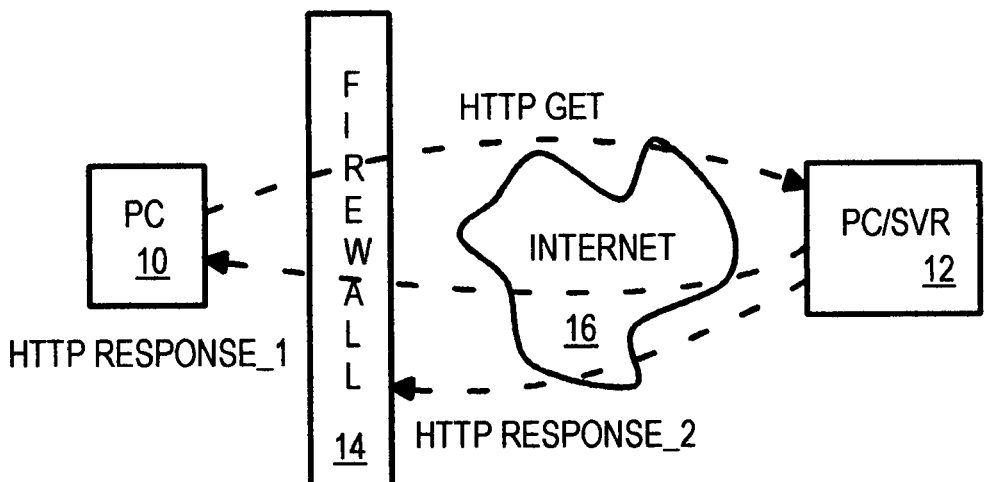
FIG. 2 illustrates how a firewall can block TCP packets for a VoIP application.
Figure 3:
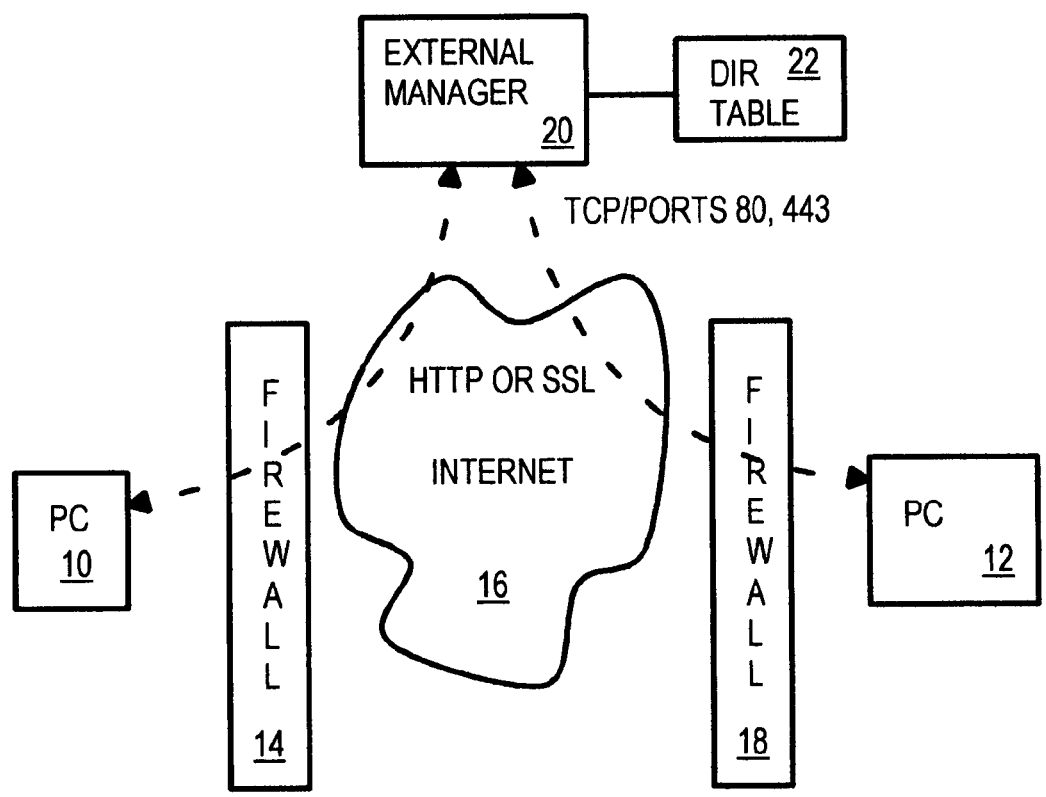
FIG. 3 shows an external manager for setting up a communication channel through firewalls.

FIG. 3 shows an external manager for setting up a communication channel through firewalls. PC 10 is on a local network protected by firewall 14, while server or PC 12 is on a local network protected by firewall 18. Firewalls 14, 18 filter packets, translate addresses, act as proxy servers, or otherwise provide protection from Internet 16.

External manger 20 is on a server accessible from Internet 16. External manager 20 can be accessed by both PC 10 and PC 12. Since web browsers use the Transport-Control-Protocol (TCP) on port 80, or the SSL protocol on port 443, firewalls 14, 18 are configured by default to allow incoming TCP packets from ports 80 and 443, although usually only when PC 10 or PC 12 first initiate a TCP connection to external manager 20 from within the firewall. Rather than use port 80, port 443 may be used for secure web connections using SSL. Firewalls 14, 18 may even have a session table that tracks SSL sessions or matches HTTP responses with HTTP GET's.

A communication program such as VoIP may prefer to make a direct connection between PC 10 and PC 12. However, firewalls 14, 18 may not allow connections to be initiated from outside the firewall. Instead, external manager 20 acts as a proxy, passing voice data between PC's 10, 12.

PC 10 and PC 12 connect to external manager 20, which registers each PC by storing addresses and ports for the PCs in directory table 22. Keep-alive messages may be used to maintain the TCP connections.

When PC 10 attempts to initiate a call to PC 12, PC 10 uses TCP port 80 to send the call request to external manager 20. External manager 20 then searches for the address and port information for PC 12 in directory table 22. This information is used to route voice-data messages through external manager 20 to PC 12.

PC 12 can open a connection when registering and then periodically send a keep-alive packet to external manager 20 to maintain its connection. Once a call is initiated, PC 12 sends voice data in TCP packets through firewall 18 using web standards such as HTTP or SSL. External manager 20 then extracts the voice data and sends it to PC 10 over the connection to PC 10.

A window in firewall 14 is opened when PC 10 connects to external manager 20 using HTTP or SSL. A similar window in firewall 18 is opened when PC 12 connects to external manager 20 using HTTP or SSL. Thus windows are opened in both firewalls 14, 18. External manager 20 acts as a third party message-passing service, passing voice data messages between PC's 10, 12.

Figure 4:
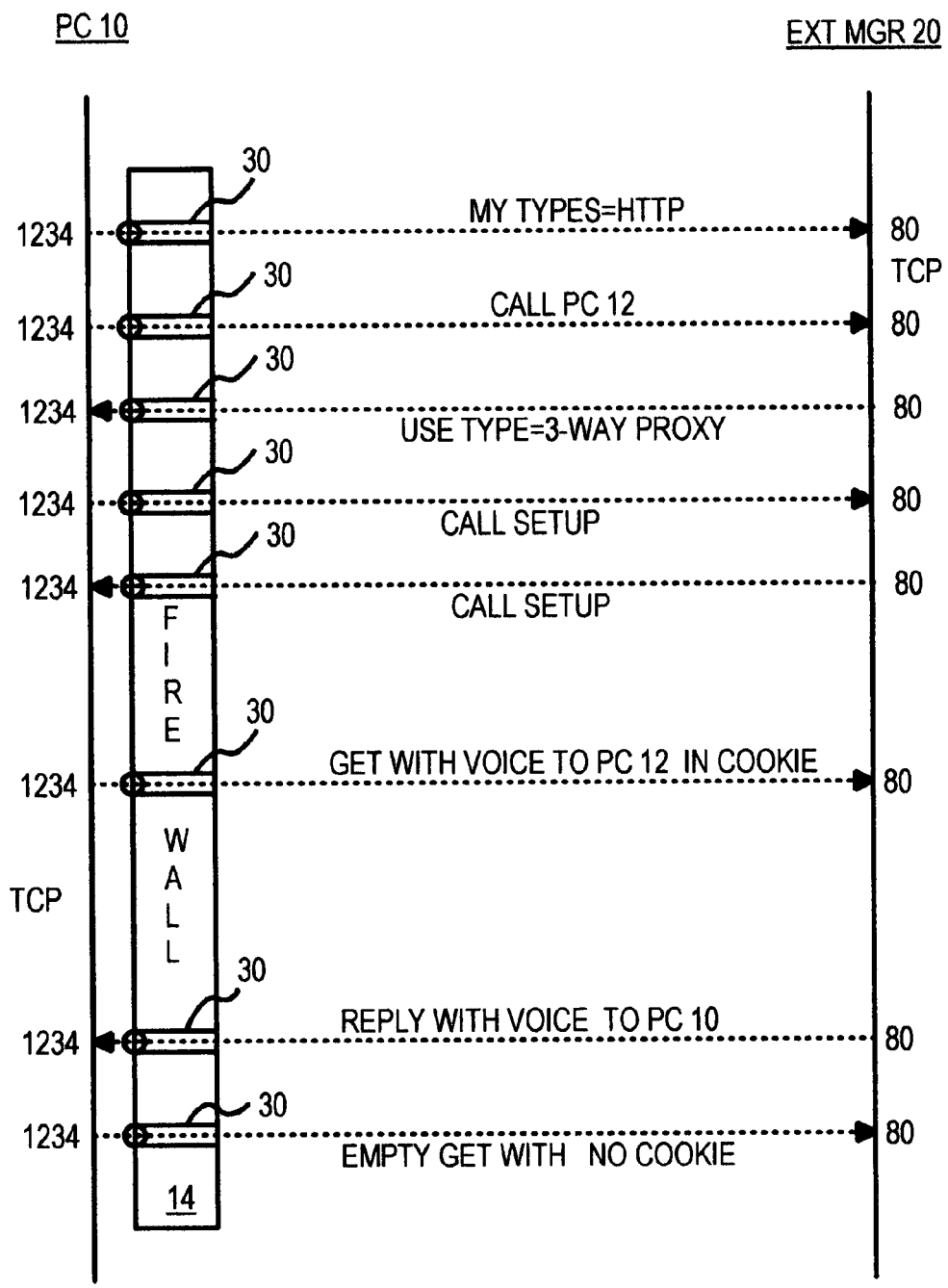
FIG. 4 is a diagram showing messages sent and connections made between one PC and the external manager.

FIG. 4 is a diagram showing messages sent and connections made one PC and the external manager. External manager 20 receives registration requests from various locations on the Internet, including PC 10 and PC 12 (not shown). PC 12 opens a TCP connection to port 80 of external manager 20. Likewise, PC 10 registers with external manager 20 by opening a TCP connection to port 80, and sending information such as communication capabilities of PC 10.

Since a TCP connection to port 80 is made to external manager 20, these request-message packets can pass through any local firewalls that protect PC 10. As long as PC 10 can browse the web, which uses TCP/80, PC 10 can access external manager 20. Reply packets from external manager 20 can also pass through the firewall through window 30 that is automatically set up by the firewall when the PC first connects with external manager 20. Window 30 is for web-browser traffic to port 80. Some firewalls may close windows 30 when the HTTP protocol is not being followed, such as when two or more response messages reply to the same GET message.

When the user at PC 10 wishes to communicate with the user at PC 12, a call-setup request is sent to external manager 20. The same TCP port 80 is used, and the same TCP connection as the registration. In this example the call request is contained in packet or packets that are sent to TCP port 80 from port 1234 of PC 10. The call request from PC 10 identifies PC 12 as the called party.

External manager 20 searches its directory table for more information on the called party, PC 12, and finds its IP address and TCP port. External manager 20 sends a call notification request to this port of PC 12 using the TCP connection. A reply message instructing PC 10 what communication method to use (such as using external manager 20 as a 3-way proxy) may be sent to port 1234 of PC 10 once the call is ready to be set up. Additional messages in packets may be exchanged between PC 10 and external manager 20 to set up the call. Some of this call information may be passed on to PC 12 by external manager 20.

HTTP GET may Limit Data

Once the call is setup, voice data can be sent from PC 10 to external manager 20, which routes the voice data to PC 12. PC 10 can send HTTP GET statements since PC 10 is acting as an HTTP client. However, HTTP GET statements usually do not contain much data. Since the GET command was designed to request information from a server, a locator for the requested data is the primary data in a GET message. Locators such as a universal-resource-locator (URL) are often relatively small in size. Intermediate proxies may read and alter URL's to remove spaces or to point to cached resources. Long URL's can be rejected by servers and perhaps detected by firewalls.

HTTP GET command syntax does not allow for long data fields that could be used for carrying voice data. While some data may be embedded in the locator, such as a stock ticker symbol, generally the length of the data is limited since long URL's may be rejected by some servers. For example, the length of the URL may be limited to 2K characters or some other length. Audio data is much longer and long voice clips could not fit inside a URL, or would require too many GET messages.

Voice Data Embedded in Cookies

Cookies are files that contain user data that are stored on the user's PC. Cookies were designed to store user information for a web-site. For example, a cookie can store a user's account number and shopping preferences for a particular store's web site. The web site first generates the cookie and sends it to the user's PC, which stores the cookie on the client PC's hard disk. Later, when the user again connects to the web site, the stored cookie is sent with the request to the web site, and the server uses information in the user's cookie to alter the displayed web pages. For example, the server can look up the user's account number and show a list of prior orders or preferred shopping items.

Cookies typically contain just a small amount of data, such as account numbers and preferences. However, the inventor has discovered that cookies can be used to send large amounts of audio data. The client generates a cookie from the audio data ready to be transmitted as VoIP voice data. This "VoIP cookie" containing the audio data is then sent to the server. The server extracts the audio data from the cookie and forwards the audio data to the other party in the call, such as PC 12.

Thus while the typical cookie is generated by the server; the VoIP cookie is generated by the client. The typical cookie is stored on the client; VoIP cookies are generated and transmitted rather than stored for long periods of time. While the typical cookie is small, containing only user data, the VoIP cookie is large, containing streams of audio data.

Although cookies are typically small, they can be as 4K bytes. Firewalls readily pass 4K cookies with GET messages, even though other parts of the GET message are limited in size. Thus the inventor has discovered that large amounts of audio data can be embedded within a cookie that is sent with a HTTP GET message.

In FIG. 4, when PC 10 captures the user's voice, the VoIP application running on PC 10 compresses and encodes the data, such as by using a voice codec. The audio data is then converted from a binary format to a text or character format such as ASCII (American Standard Code for Information Interchange) characters, and the ASCII audio data stream is divided into chunks. Each chunk of audio data is placed inside a cookie and sent with an HTTP GET message from PC 10 to port 80 of external manager 20. External manager 20 extracts the chunks of audio data, re-assembles the audio stream and sends it to PC 12, such as by embedding the audio data in HTTP response messages to PC 12.

When external manger 20 receives audio data from PC 12, the audio data is placed into the data fields of HTTP response messages. Since HTTP response messages were designed to contain large amounts of server data, the audio data can readily be placed in an HTTP response message that is a reply to the HTTP GET from PC 10. This HTTP response can readily pass through firewall 14 since it is a reply to the prior HTTP GET from PC 10 to external manager 20.

Empty AGET Keeps Firewall Open

Since a firewall may only allow one HTTP response for each HTTP GET, PC 10 sends back another HTTP GET when an HTTP response from external manager 20 is received. When PC 10 has audio data to send, the audio data can be embedded in a cookie attached to the GET message. However, when PC 10 has no audio data to send, an empty GET is sent without a cookie, or with no audio data in the cookie. This empty HTTP GET message allows another HTTP response message to get through firewall 14. Thus the empty GET allows a series of HTTP response messages to be sent from external manager 20 through firewall 14, even when PC 10 is not sending any audio data.

Figure 5:
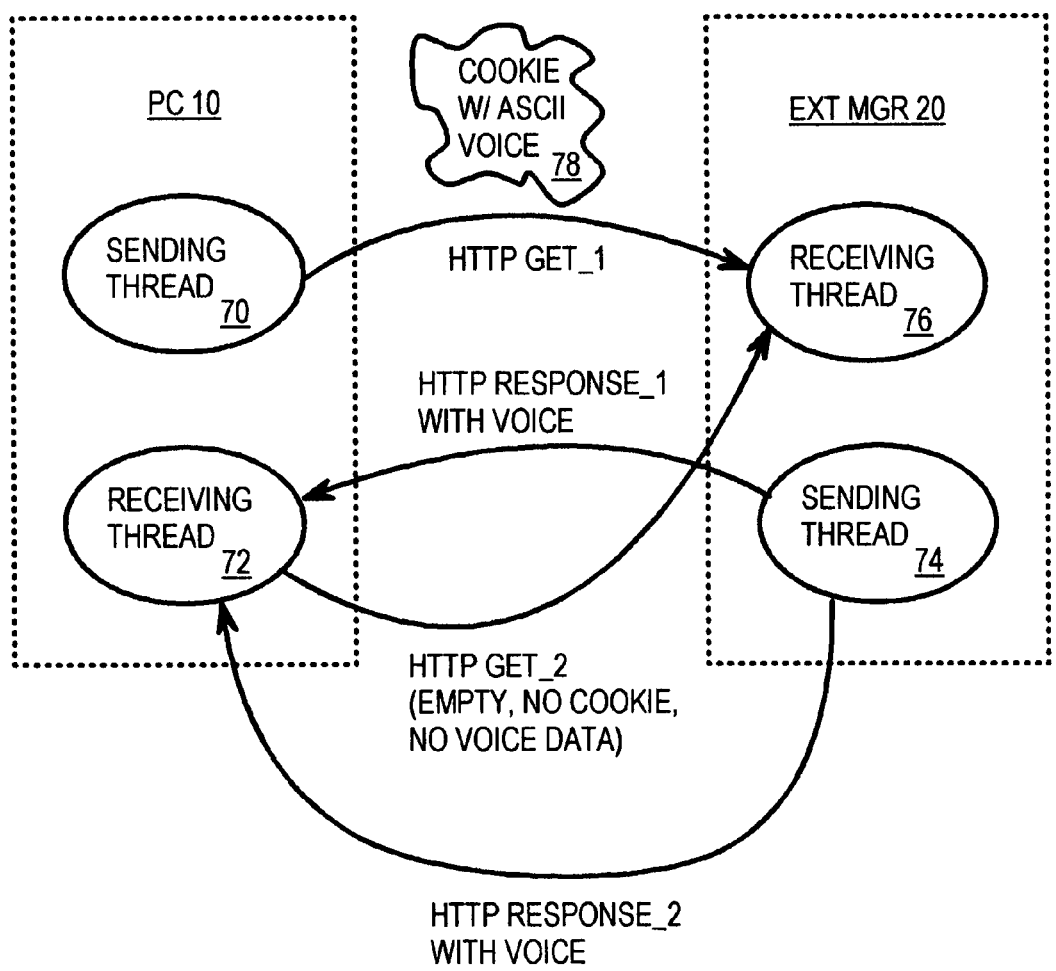
FIG. 5 shows VoIP Cookies, HTTP responses, and Empty GET messages passed between the client PC and the external manager.

FIG. 5 shows VoIP Cookies, HTTP responses, and Empty GET messages passed between the client PC and the external manager. PC 10 acts as a client that connects to a sever, external manager 20, using what appears to be a web connection (TCP, port 80, HTTP). PC 10 runs a VoIP application that includes sending thread 70 and receiving thread 72. External manager 20 runs applications that include receiving thread 76 and sending thread 74 that interface with PC 10. External manager 20 may have many pairs of sending and receiving threads running for interfaces to many different calling parties. External manager 20 may also run routing software that routes audio data from one interface's threads to another interface's threads.

Audio data such as the user's captured voice is coded and sent by sending thread 70 to receiving thread 76 on external manager 20, which then forwards the audio data to the other calling party (PC 12). Return audio data such as the captured voice from the other calling party on remote PC 12 is received by external manager 20 and forwarded to sending thread 74. This return audio data is sent from sending thread 74 on external manager 20 to receiving thread 72 on PC 10.

Voice data from PC 10 is coded as ASCII text characters and embedded inside VoIP cookie 78. VoIP cookie 78 is attached to an HTTP GET message from sending thread 70 of PC 10 to receiving thread 76 of external manager 20. Receiving thread 76 extracts the audio data and forwards it to remote PC 12. A variety of methods such as UDP, TCP, SSL, etc. may be used to transfer the voice data from external manager 20 to remote PC 12.

When voice data is received from remote PC 12 by external manager 20, it is forwarded to sending thread 74, which forms an HTTP response message, response_1. The audio data is contained in the normal server-data field in the HTTP response message.

This HTTP response_1 message is sent over the Internet to receiving thread 72 on PC 10. Receiving thread 72 extracts the audio data, decodes and de-compresses it, and plays the audio to the user of PC 10.

When receiving thread 72 of PC 10 receives an HTTP response message, it immediately sends an empty HTTP GET back to external manager 20. This empty GET contains no audio data and does not need a VoIP cookie. The empty GET can be ignored by receiving thread 76 of external manager 20. The empty GET ensures that the firewall will allow another HTTP response from external manager 20. Sending thread 74 of external manager 20 can then send another HTTP response, response_2, with additional audio data.

Sending thread 74 could wait for receiving thread 76 to receive the empty GET before sending the next message, response_2, for a more robust implementation. Alternately, to reduce latency, sending thread 74 may act independently of receiving thread 76 and send the second response right after the first response, since it is likely that the empty GET will arrive at the firewall before the second response arrives at the firewall.

By PC 10 sending an empty GET for each HTTP response, sending thread 74 on external manager 20 is able to stream a series of response messages to PC 10, allowing return audio data to be sent without delay when only one party is speaking. When the user of PC 10 is speaking, a series of GET messages with VoIP cookies can be sent since the firewall allows any number of GET's to be sent. Only the response messages are matched to the GET's. The GET's are not matched to the responses.

FIG. 6A shows an HTTP GET message with a VoIP cookie that contains audio data. GET message 80 follows the HTTP protocol and contains several fields or lines. The VoIP application mimics a GET message from a web-browser so that GET message 80 appears to a firewall to be from a web browser.

GET message 80 includes VoIP cookie 82 which contains audio data. Since cookie 82 is not allowed to contain binary data, the binary audio data is converted to ASCII characters to generate the audio data inside VoIP cookie 82. Cookie 82 begins with the Cookie: protocol element followed by the cookie name "X" with the cookie's data following the equal sign. The end of the cookie can be indicated by a carriage return (CR) followed by a line feed (LF).

The first line (field) of GET message 80 includes the HTTP GET command and the version of the HTTP protocol (1.1) used by the message, along with a file or resource name. Other lines in GET message 80 give further details, such as the server's IP address, information about the kind of browser or other software used by the client, which is the user agent, the language used (US English), special characters allowed, such as the forward slash, and encoding methods that can be used by the server data.

Some GET messages may have some lines and fields and not others. In particular, GET messages for more recent versions of the HTTP protocol may include additional statements for newer features and capabilities. Since some of the HTTP fields in the message are used by web browsers but not used by the VoIP software, some fields can have dummy names or data.

The lines or fields in GET message 80 are often limited in the number of characters allowed for each field. In contrast, the cookie is allowed to be larger, making it ideal for storing the large amounts of audio data. Cookies have a size limit of 4096 bytes in current protocols.

FIG. 6B shows an HTTP response message that contains audio data. Response message 84 is generated by a server such as the external manager. A typical web server replies to a GET message from a client by sending a response message. Since some of the HTTP fields in the response message are used by web servers but not needed by the VoIP software, some fields can have dummy names or data, or be missing from response message 84.

The first line of response message 84 contains the protocol (HTTP) and version (1.1), and a status code (200) and status message (OK). The second line contains identification information on the server, while the message creation date and time and expiration date/time are also specified on other lines. Caching of the data in response message 84 can be controlled by the cache-control statement, such as not allowing the data to be cached by intermediate caching servers or by the client web browser. Alternately, the server's data may be cached until the expiration date and time.

Information about the data (content) from the server in response message 84 includes the data's length in the content-length line, and the data type in the content-type line. The server's data is contained in data field 86 at the end of response message 84. This data is the voice or audio data from the remote user, such as from PC 12 that is routed through the external manager. The audio data can be sent in the more efficient binary format in data field 86.

Figure 7:
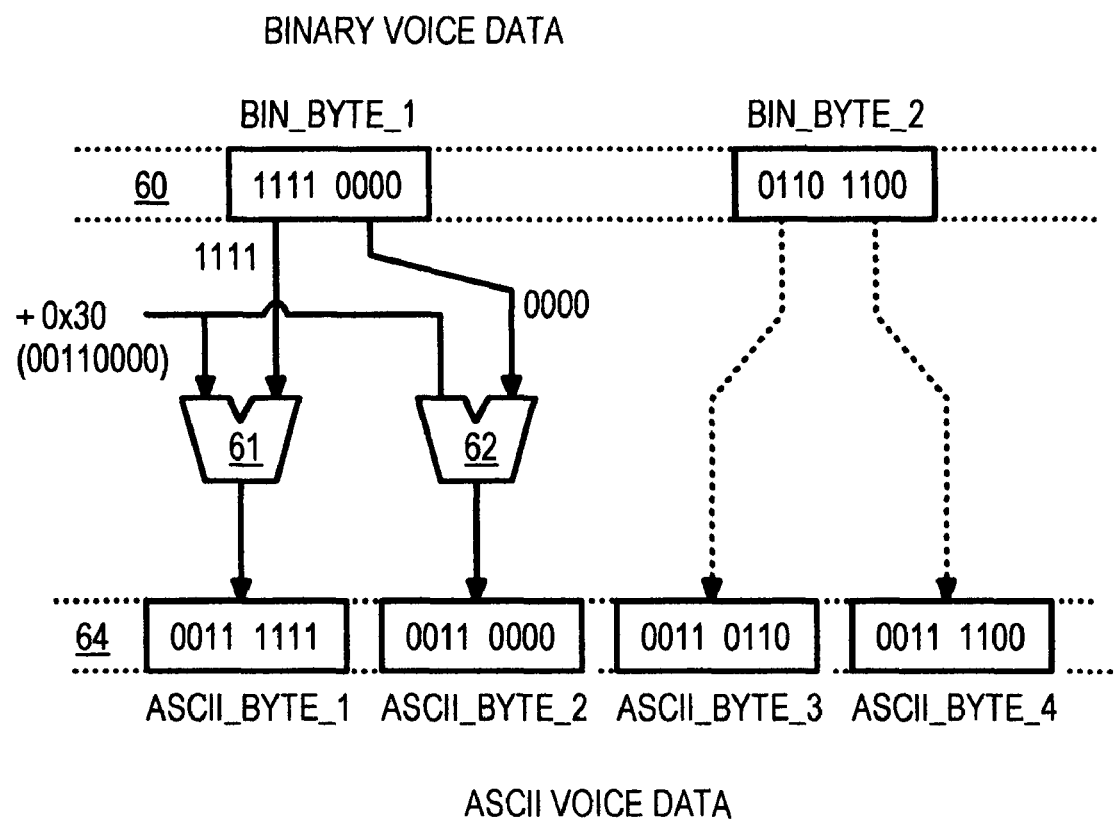
FIG. 7 hoghlights conversation of bianry audio into ASCII format for embedding inside a cookie.

FIG. 7 highlights conversation of binary audio data into ASCII format for embedding inside a cookie. Audio data is captured, encoded, and compressed to generate binary audio stream 60. The binary audio format can have any of several different kinds and formats of encoding, which may use all 8 bits in each byte of audio data in binary audio stream 60. Thus values of each byte in stream 60 may range from zero to 255.

The ASCII format was designed to encode alpha-numeric characters and was expanded to include some non-printing and control characters. However, the range of valid data values for ASCII is more limited than for binary. Valid ASCII characters range in value from 0 to 127, with the printable characters being in the range of 32 to 126. For example, the binary values 11111111, 11000000, and 11110000 are allowable binary value but illegal ASCII values since they are larger than 127. ASCII is a less efficient coding method than binary since it has many illegal values.

The bianry data is expanded to convert it to valid ASCII data. Each binary byte is expanded to two ASCII bytes in this embodiment. For example, binary byte 2 of binary audio stream 60 is converted to ASCII bytes 3 and 4 of ASCII audio stream 64.

To convert from binary to ASCII, each binary byte is divided into two 4-bit nibbles of data. The value 48 (0x30 Hex, or 00110000) is added to each nibble, or each nibble is appended to 0010 to form an ASCII byte. Since the lower nibble can range from 0 to 15, the converted ASCII bytes can range from 48 to 63. This is within the printable ASCII character range of 32 to 126, making the converted audio data appear to be ordinary text to any firewall reading the converted data.

For example, binary byte 1 is divided into two nibbles. The first nibble, 1111, is added to 00110000 by adder 61 to produce 00111111, which is the first ASCII byte in ASCII audio stream 64. The second binary nibble, 0000, is added to 00110000 by adder 62 to produce 00110000, the second ASCII byte.

Adders 61, 62 could be the same adder, and could be part of an arithmetic-logic-unit (ALU) that is part of a programmable processor. Parallel adders in a dedicated data converter could also be used. Conversion could be performed in hardware or by software.

Figure 8A:
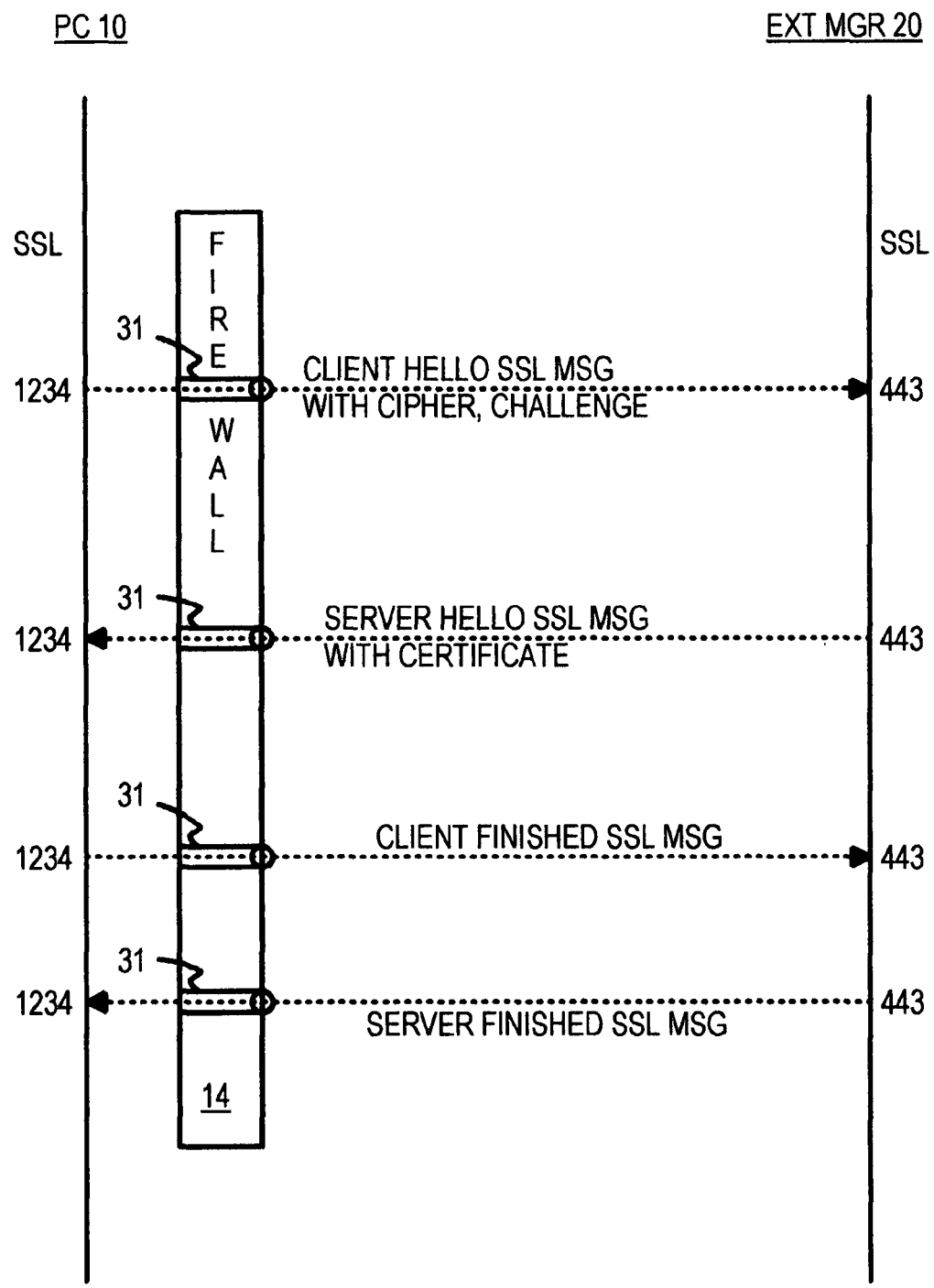
FIG. 8A-B show establishment of a SSL session for exchanging VoIP audio data.
Figure 8B:
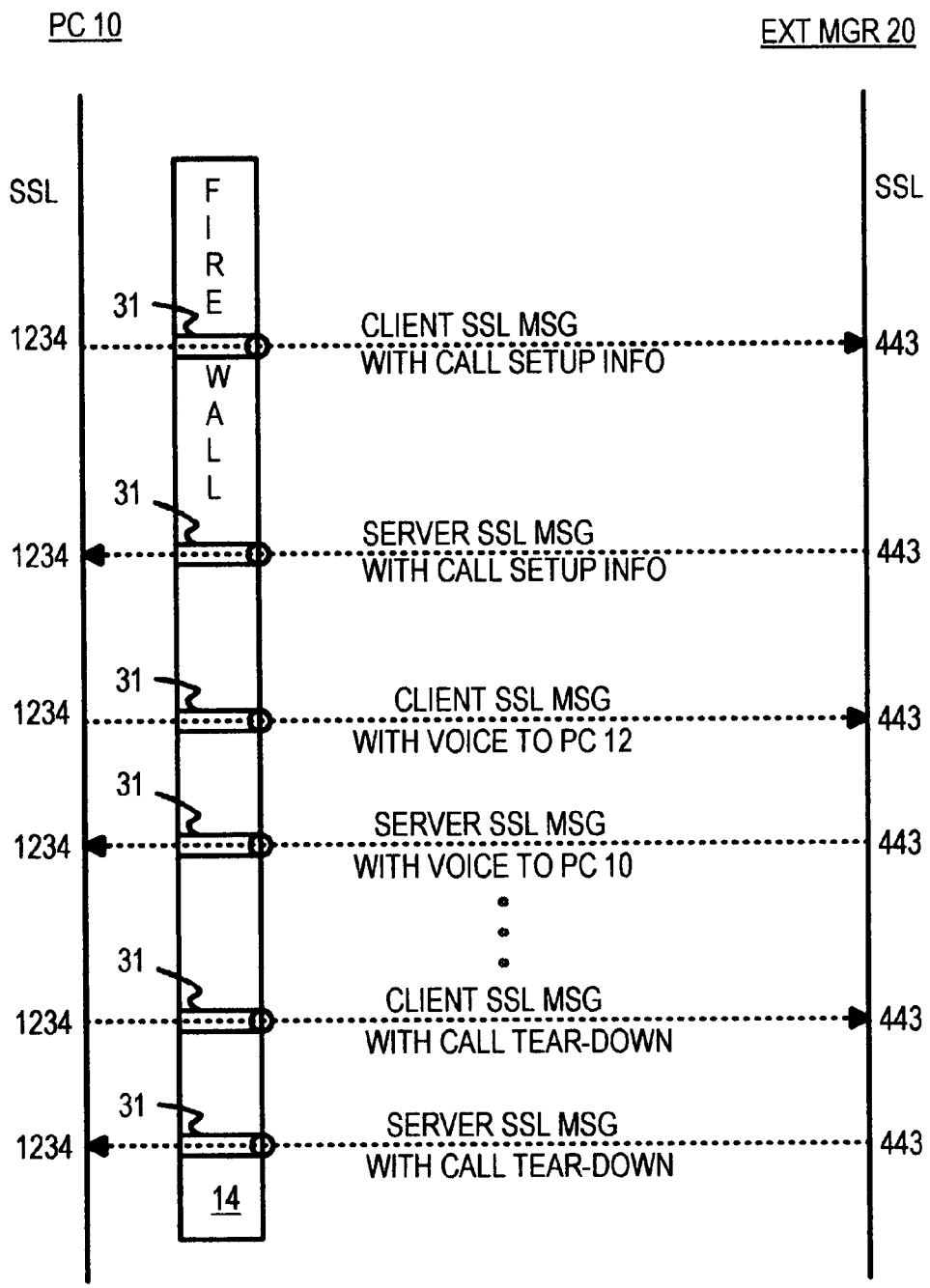

FIG. 8A-B show establishment of a SSL session for exchanging VoIP audio data. The secure-sockets layer (SSL) protocol provides secure communications for passing sensitive information such as credit card numbers over the Internet. The inventor has discovered that SSL can also be used to transport audio data through a restrictive firewall.

Rather than use port 80, SSL servers are accessed through port 443. Since SSL is commonly used by web sites, most firewalls allow SSL traffic to port 443. Some firewalls may check some or all of the packets to make sure that the packets exchanged contain messages that follow the SSL handshake protocols, but since the data transferred by SSL is encrypted, the firewall cannot determine if the data is audio data or secure web data. Once the SSL session is properly established, SSL messages may be freely exchanged. Since theses later SSL messages have only small headers, almost the entire message may be used to carry audio data, reducing overhead. Thus SSL can be more efficient than HTTP for transferring audio data streams.

The inventor has discovered that several of the SSL messages exchanged when initiating a new SSL session can be combined. For example, a combined client finished message can combine 3 SSL messages: client key exchange, change cipher spec, and finished. A combined server finished message can combine 2 SSL messages: change cipher spec and finished. Combining SSL messages reduces the number of messages exchanged. A pair of "Hello" messages are first exchanged between the client (PC 10) and server (external manager 20). Then a pair of "Finished" messages are exchanged and the SSL session is established.

Messages can then be freely exchanged with status, call setup, audio data, and teardown. The data exchanged does not actually have to be encrypted, as long as the messages are in the same format as ordinary SSL messages, and the SSL session was established with the normal exchange of messages. Since the audio data is coded and usually compressed, often using proprietary methods, the audio data is already in a format that is not easily readable, so full key encryption is not needed but could be added.

In FIG. 8A, PC 10 begins to establish a SSL session with external manager 20 by sending a client hello message to port 443 of external manager 20. SSL window 31 in firewall 14 allows packets to pass through firewall 14 when the packets appear to firewall 14 to be following the SSL protocol.

The initial client hello message contains a public key from the client, known as the cipher and a challenge string that can be used to generate a session key for the new SSL session. The server, external manager 20, responds to the client hello message by sending a server hello message back to the sending port 1234 of PC 10. This server hello contains the server's certificate that can be checked with a key authority to verify the server's identity.

The client responds to the server hello message with a client finished message, and the server replies with a server finished message. Establishment of the SSL session is now finished. Since the client and server intend to transfer audio data and do not really want a secure session, several of the fields in the hello and finished messages can contain arbitrary data. Actual keys and certificates do not have to be exchanged, although the lengths of data in these fields should match the specified lengths.

In FIG. 8B, status and call setup information can be exchanged using SSL messages.

When the user of PC 10 desires to call the user of PC 12, a call request can be sent to external manager 20 in an SSL message with call setup information such as an identifier for PC 12. External manager 20 can contact PC 12 and return more call setup information in a server SSL message. Each SSL message can be contained in one or more TCP/IP packets.

Once the call is set up, audio data can be exchanged. Client PC 10 can capture, encode, and compress the user's voice and generate a binary data stream of audio data. This audio data can be placed in client SSL messages to external manager 20, which forwards the audio data to PC 12. Return audio data from PC 12 can be sent from external manager 20 to PC 10 inside a server SSL messages. The headers for these SSL messages mimic standard SSL headers, but the data within the SSL messages is the audio data, not data that is encrypted using the session key.

Once the VoIP call ends, call teardown information or commands can be exchanged between PC 10 and external manager 20 using client and server SSL messages. Later, the SSL session can be terminated by closing the TCP connection such as by sending TCP FIN packets.

Example formats for the client and server hello and finished SSL messages are shown below. Comments appear after the double slashes and data values are in hexadecimal.

Figure 9:
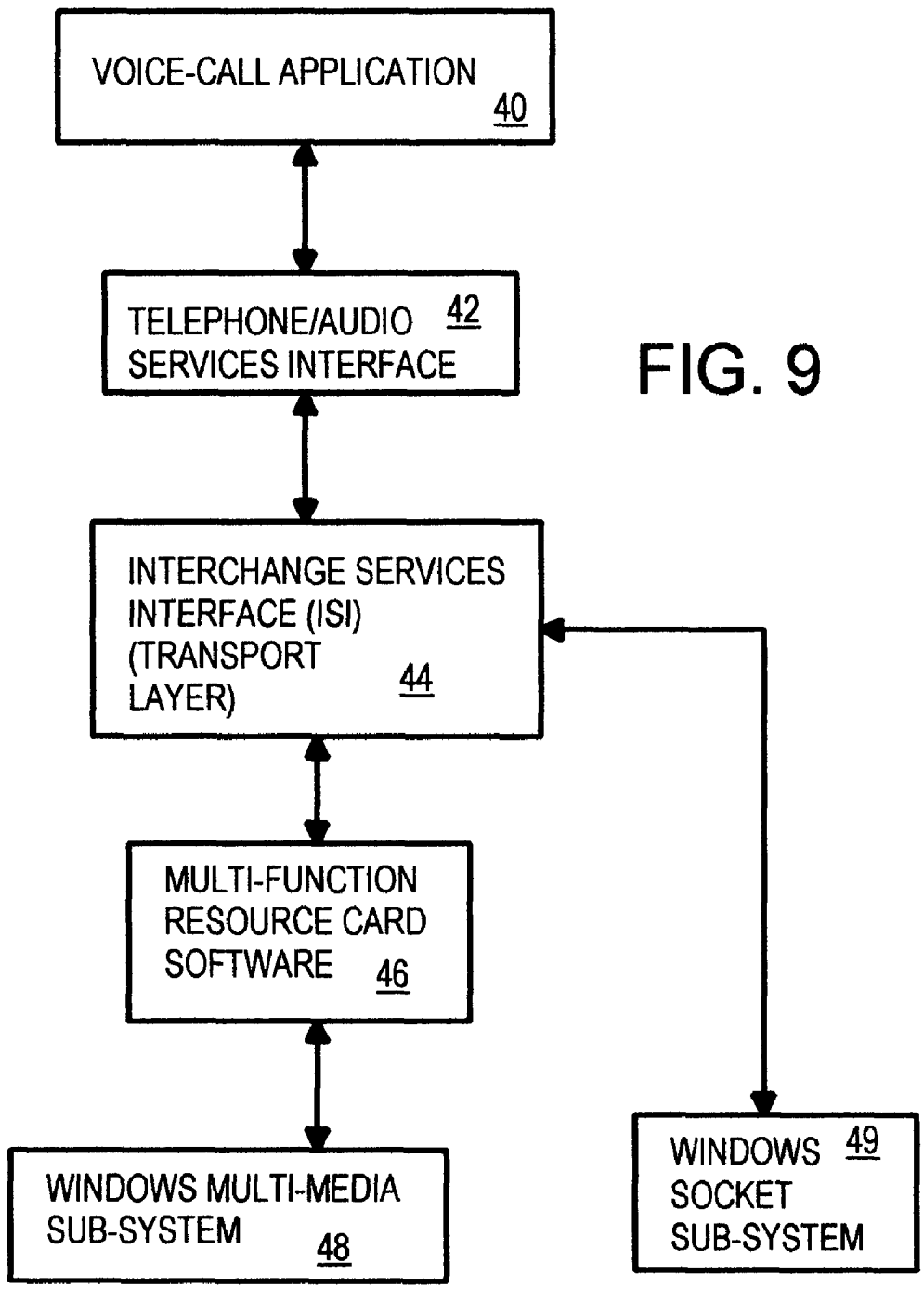
FIG. 9 is a block diagram of software and hardware components in a direct communication system on a client computer.

CrystalVoice Server HELLO
0x16 // handshake
0x03 0x00 // version
0x04 0x2D // length of message
0x02 // server hello
0x00 0x00 0x46 // length of server hello portion
. . . // 70 made-up bytes
. . . // CrystalVoice certificate
CrystalVoice Server FINISHED
0x14 // change cipher spec
0x03 0x00 // version
0x00 0x01 // length of message
0x01 // message contents
0x16 // handshake
0x03 0x00 // version
0x00 0x38 // length of message
. . . // 56 made-up bytes for the encrypted "finished" message CrystalVoice Client HELLO
0x80, 0x4C, // high bit set plus length of rest of packet
0x01, // client hello message type
0x03, 0x00, // SSL version 3.0
0x00, 0x33, // length of cipher
0x00, 0x00, // length of session ID
0x00, 0x10, // length of challenge byte
0x00, 0x00, 0x04, // cipher
0x00, 0x00, 0x05, // cipher
0x00, 0x00, 0x0A, // cipher
0x01, 0x00, 0x80, // cipher
0x07, 0x00, 0xC0, // cipher
0x03, 0x00, 0x80, // cipher
0x00, 0x00, 0x09, // cipher
0x06, 0x00, 0x40, // cipher
0x00, 0x00, 0x64, // cipher
0x00, 0x00, 0x62, // cipher
0x00, 0x00, 0x03, // cipher
0x00, 0x00, 0x06, // cipher
0x02, 0x00, 0x80, // cipher
0x04, 0x00, 0x80, // cipher
0x00, 0x00, 0x13, // cipher
0x00, 0x00, 0x12, // cipher
0x00, 0x00, 0x63, // cipher
0xC2, 0x4E, // random challenge bytes
0xED, 0x20, // random challenge bytes
0xF0, 0x41, // random challenge bytes
0x1F, 0x99, // random challenge bytes
0xDA, 0xE5, // random challenge bytes
0x82, 0xDE, // random challenge bytes
0x0E, 0xE1, // random challenge bytes
0x19, 0x5B // random challenge bytes
CrystalVoice Client FINISHED
0x16 // handshake
0x03 0x00 // version
0x0x84 // length of message
0x10 // client key exchange
. . . // 131 made-up key exchange bytes
0x14 // change cipher spec
0x03 0x00 // version
0x00 0x01 // length of message
0x01 // message contents
0x16 // handshake
0x03 0x00 // version
0x00 0x38 // length of message
. . . // 56 made-up bytes for the encrypted "finished" message FIG. 9 is a block diagram of software and hardware components in a direct communication system on a client computer. Voice-call application 40 is a high-level application that can be operated by a user of the client PC. The user can initiate and terminate voice or audio/video calls over the Internet using a user interface to application 40.

Telephony/Audio Services Interface (TASI) 42 is a development environment that provides an application programming interface (API) for using library features or functions called by application 40. TASI 42 can have a variety of services such as call control (detecting, placing, and terminating calls between clients) and audio stream control and formatting.

Interchange services 44 corresponds to the OSI-model transport layer. Interchange services 44 provides packet transport using IP packets. Communication sockets in Windows socket sub-system 49 can be opened by Interchange services 44 to send and receive IP packets containing audio or video data to a remote client over the Internet. Of course, socket sub-systems other than Windows can be substituted such as UNIX or LINUX sub-systems.

Multi-function resource 46 can be implemented in hardware or software or both.

Multi-function resource 46 provides a host-based software layer that performs a variety of functions. Multi-function resource 46 can perform digital-signal processor (DSP) functions, such as voice compression, echo cancellation, bad frame interpolation for late or lost packets, silence compression, voice activity detection, and comfort noise generation. In addition, multi-function resource 46 provides the ability for playing wave files on multimedia subsystem 48. Multi-function resource 46 has three main subsystems: the voice compression subsystem, the packetization subsystem, and the voice quality subsystem.

Windows multimedia subsystem 48 contains the operating system drivers and low-level components that communicate with the hardware, such as a sound card or audio subsystem. Speakers and a microphone, or other multi-media devices can be connected to the hardware controlled by multimedia subsystem 48.

Figure 10A:
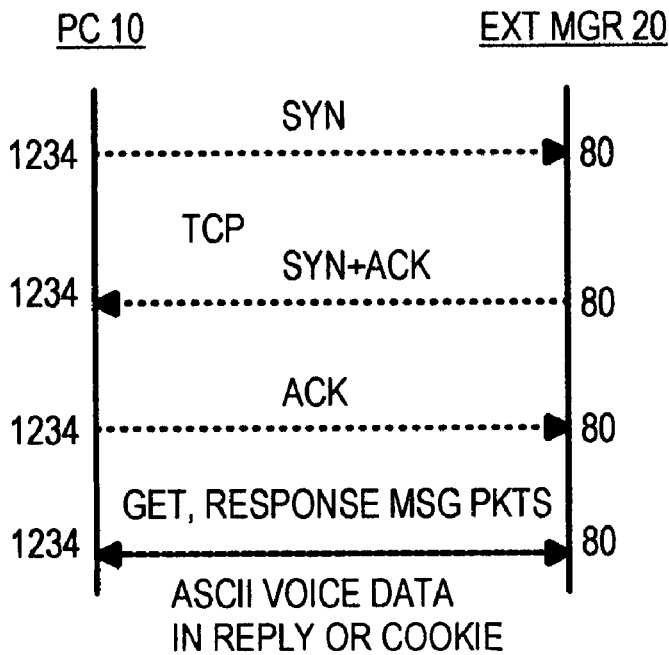
FIG. 10A shows a TCP connection between a client PC and the external manager for an HTTP session.

FIG. 10A shows a TCP connection between a client PC and the external manager for an HTTP session. The higher-level HTTP sessions use underlying TCP connections and IP packets to carry messages over the Internet.

The lower-level TCP connection begins with a SYN packet sent from PC 10 to port 80 of the external manager. The external manager responds with a SYN+ACK packet back to the sending port of the client (port 1234 in this example). The client PC 10 then finishes the handshake with an ACK packet back to external manager 20. The client PC 10 can then send data packets, such as packets containing registration, call setup, and HTTP messages containing the ASCII voice data in the cookie.

SYN and ACK are flags that can be set in the TCP packet header, such as described in the commonly-used RFC 793 standard. When a connection is closed by a FIN packet, or times out, a new SYN-ACK sequence is needed to open a new TCP connection.

Figure 10B:
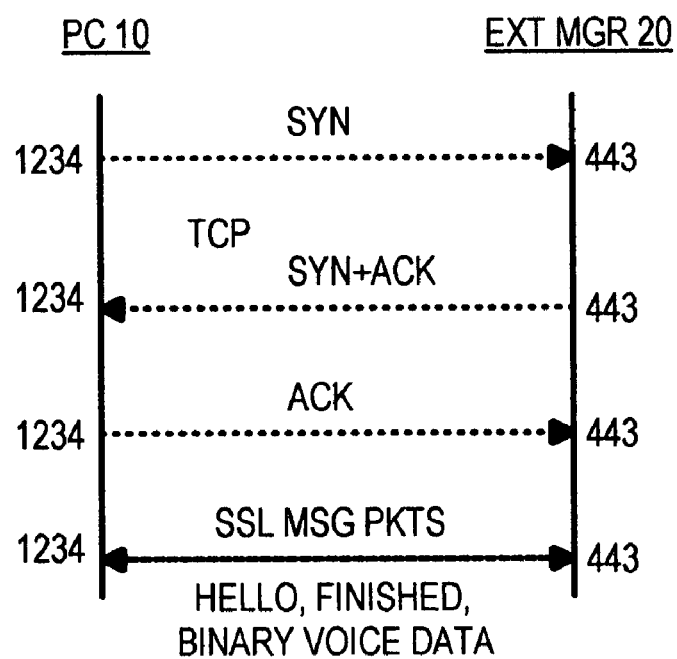
FIG. 10B shows a TCP connection between a client PC and the external manager for an SSL session.

FIG. 10B shows a TCP connection between a client PC and the external manager for an SSL session. The higher-level SSL sessions use underlying TCP connections and IP packets to carry messages over the Internet.

The lower-level TCP connection begins with a SYN packet sent from PC 10 to port 443 of the external manager. The external manager responds with a SYN+ACK packet back to the sending port of the client (port 1234 in this example). The client PC 10 then finishes the handshake with an ACK packet back to external manager 20. The client PC 10 can then send data packets, such as SSL packets containing registration, call setup, and SSL messages containing the binary voice data.

ALTERNATE EMBODIMENTS

Several other embodiments are contemplated by the inventors. For example an empty GET may be sent for each HTTP response received, regardless of whether audio data from the client is available or not, or the empty GET can be eliminated when a new GET is sent by the client's sending thread. The sending and receiving threads can thus act independently or dependently of each other. The expiration data in the HTTP response may be set to a time in the past. This prevents caching of the data by intermediate devices on the network.

Rather than have just one SSL or HTTP session between the client PC and the external manager, several sessions may occur either in sequence or simultaneously or both. One session may carry call, status, and setup information while another session carries voice data. Multi-way calling may use additional sessions for other voice channels, background music, etc. When another incoming call is detected by the external manager, it can signal the client using the initial session while the second session continues to carry voice for the existing call. Each high-level HTTP or SSL message may be contained in one low-level TCP/IP packet or each may be carried by several TCP/IP packets.

Two connections from a PC client to the external manager could be used. One of the connections could send only GET messages with voice cookies. For each GET received, the server could send an empty RESPONSE. On the other connection, the client could send only empty GET messages for each server RESPONSE with voice data received by the client.

Long sessions can be interrupted and a new session begun, either for audio data or for status channels. Rather than periodically send keep-alive messages, PC 10 could periodically open a connection to external manager 20, such as once every minute. A new connection could be made if some time has passed since registration.

Other data conversation methods can be substituted. A conversion table of binary and ASCII values could be used, or variable-length encoding or other methods employed. Other ranges of ASCII printable characters could be used by adding a different value to the binary audio nibbles. Rather than addition, a different algorithm could be used to map to the same range or to a different range.

The external manager has been described as a single server that accepts client registrations and proxies or forwards voice data during a call. Rather than use a single server or web site, separate servers or sites could be used. One server at one location could accept client registrations, and then assign another server, perhaps at a different location or web site, to proxy the voice data. Voice-proxy servers could be assigned by geographical location. One session could remain open with the registration and status server while another session is opened with the voice-proxy server that carries the voice data. Audio data could be transferred between two or more proxy servers in a chain between the calling parties. The external manager could be the other calling party such as when a user calls tech support that is located at the external manager, or for private systems where one user that makes VoIP calls also acts as the external manager for other users.

Other ports and protocols may be used. Separate sessions and port-pairs may be used for each direction of packet flow, and more than 2 client endpoints may share a packet stream. Multicasting may also be employed. Additional HTTP or SSL windows may be opened in the firewall to allow for multiple calls to different PC's. The order of the various steps may be changed, and additional steps can be included. The external manager can operate on a variety of ports, such as ports 80 and 443 or ports added by future revisions of web protocols.

The client or PC may be a portable computing device such as a personal-digital-assistant (PDA), palm computer, enhanced cell phone, Internet appliance, or other computing device rather than just a standard desktop or laptop PC. Operating systems other than Windows, such as Linux, Unix, and MacOS may be used for the PC or external manager. The external manager can reside on a server that runs many applications including web server applications. Software routines may be stored on disks or other media, or may be programmed as firmware or programmable logic or even converted to partial or full hardware implementations.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A computer-implemented method for making a voice call over an Internet comprising:
   when a secure-sockets layer (SSL) session can be established between a client and a server, using the SSL session for transport of the audio data by:
   initiating the SSL session by sending a client hello SSL message to the server, the client hello SSL message comprising a cipher and challenge bytes and SSL headers;
   receiving a server hello SSL message from the server, the server hello message comprising SSL headers and a certificate;
   sending a client finished SSL message to the server, the client finished SSL message comprising key exchange bytes, a finished message, and SSL headers;
   receiving a server finished SSL message from the server, the server finished SSL message comprising a finished message and SSL headers;
   sending the audio data to the server in a SSL data message, the audio data being located in the SSL data message in a location for encrypted data; and
   receiving the remote audio data from the server in a return SSL data message, the remote audio data being located in the return SSL data message in a location for encrypted data,
   whereby audio data replaces encrypted data in SSL messages once the SSL session is established.

2. A computer-program product comprising:
   a non-transitory computer-usable medium having computer-readable program code means embodied therein for communicating audio data from a client to a server through a firewall, the computer-readable program code means in the computer-program product comprising:
   network connection means for transmitting and receiving packets from an Internet, the packets including Transmission Control Protocol (TCP) packets from an external manager at the server;
   secure-sockets layer (SSL) means for establishing a pseudo-SSL session between the client and the server by exchanging pseudo-keys in SSL messages that mimic SSL-protocol messages;
   client audio streaming means, receiving a client audio stream, for sending audio data from the client audio stream to the server by placing the audio data in SSL data messages after the pseudo-SSL session has been established, the SSL data messages carrying the audio data in place of encrypted data;
   remote audio streaming means, receiving a remote audio stream for playback to a local user, for receiving from the server remote audio data in the remote audio stream, the remote audio streaming means extracting the remote audio data from audio data in SSL return data messages sent by the server to the client after the pseudo-SSL session has been established, the SSL return data messages carrying the remote audio data in place of encrypted data;
   wherein a SSL window in the firewall is created when the SSL session is established, the SSL window allowing TCP packets transporting the SSL return data messages from the server to reach the network connection means through the firewall; and
   whereby the SSL window in the firewall is created for use by the server to send the remote audio stream to the client.

3. The computer-program product of claim 2 wherein the secure-sockets layer (SSL) means further comprises:
   client hello means for generating a client hello SSL message to the server, the client hello SSL message comprising a pseudo-cipher, a pseudo-challenge string, a length of the pseudo-cipher, and a length of the pseudo-challenge string, and SSL header codes; and
   client finished means for generating a client finished SSL message to the server in response to a server hello SSL message received from the server, the client finished SSL message comprising a pseudo-exchange-key, a pseudo-finished string, a length of the pseudo-exchange-key, and a length of the pseudo-finished string, and a SSL handshake code,
   whereby the pseudo-SSL session is established by exchanging the client hello SSL message, the server hello SSL message, and the client finished SSL message.

* * * * *